(No Model.)
4 Sheets—Sheet 1.
S. T. BRALEY.
PLATFORM SCALE.
No. 509,592.
Patented Nov. 28, 1893.
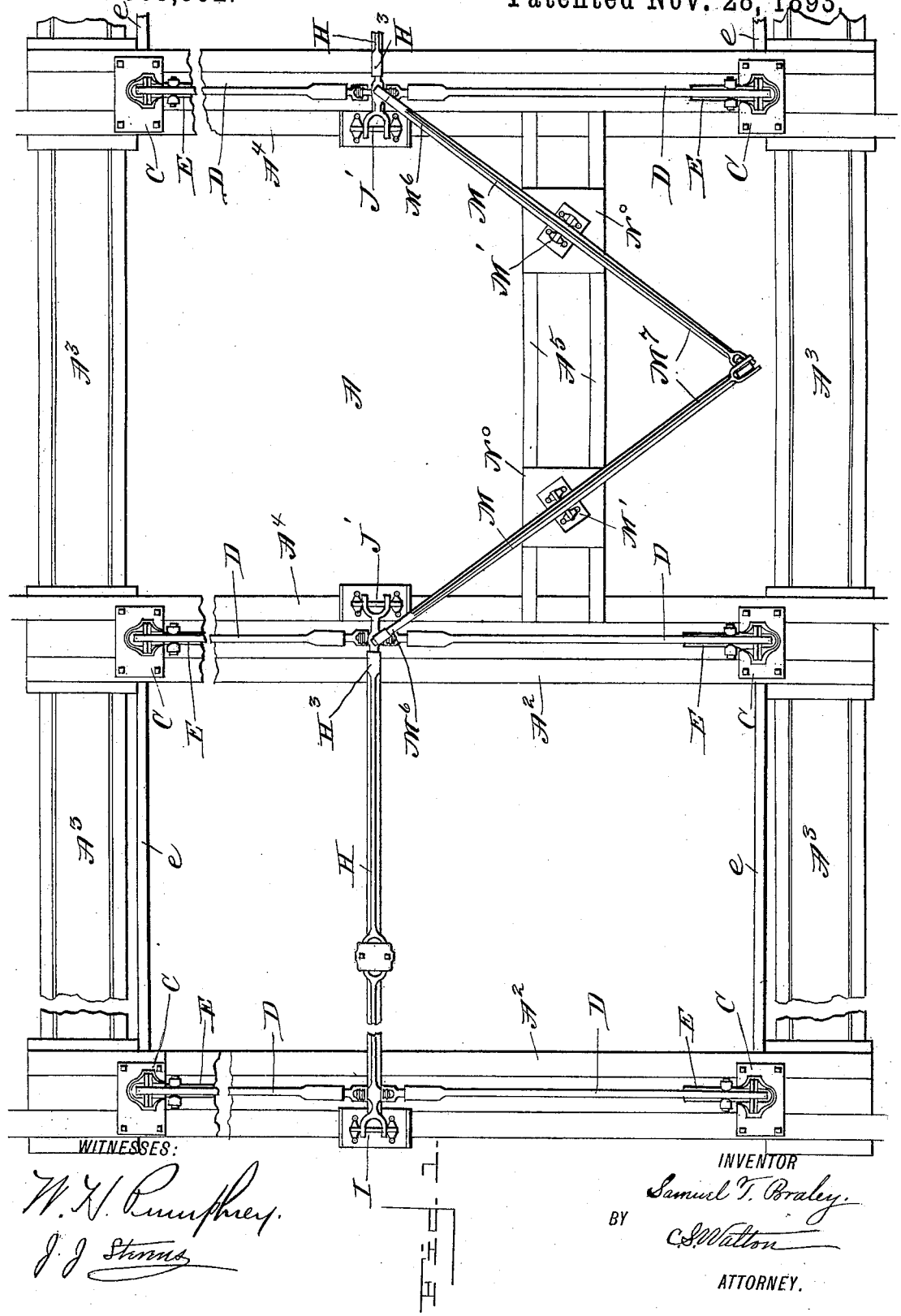
WITNESSES:
INVENTOR
Samuel T. Braley.
BY
C. S. Walton
ATTORNEY.

(No Model.) 4 Sheets—Sheet 2.
S. T. BRALEY.
PLATFORM SCALE.
No. 509,592. Patented Nov. 28, 1893.
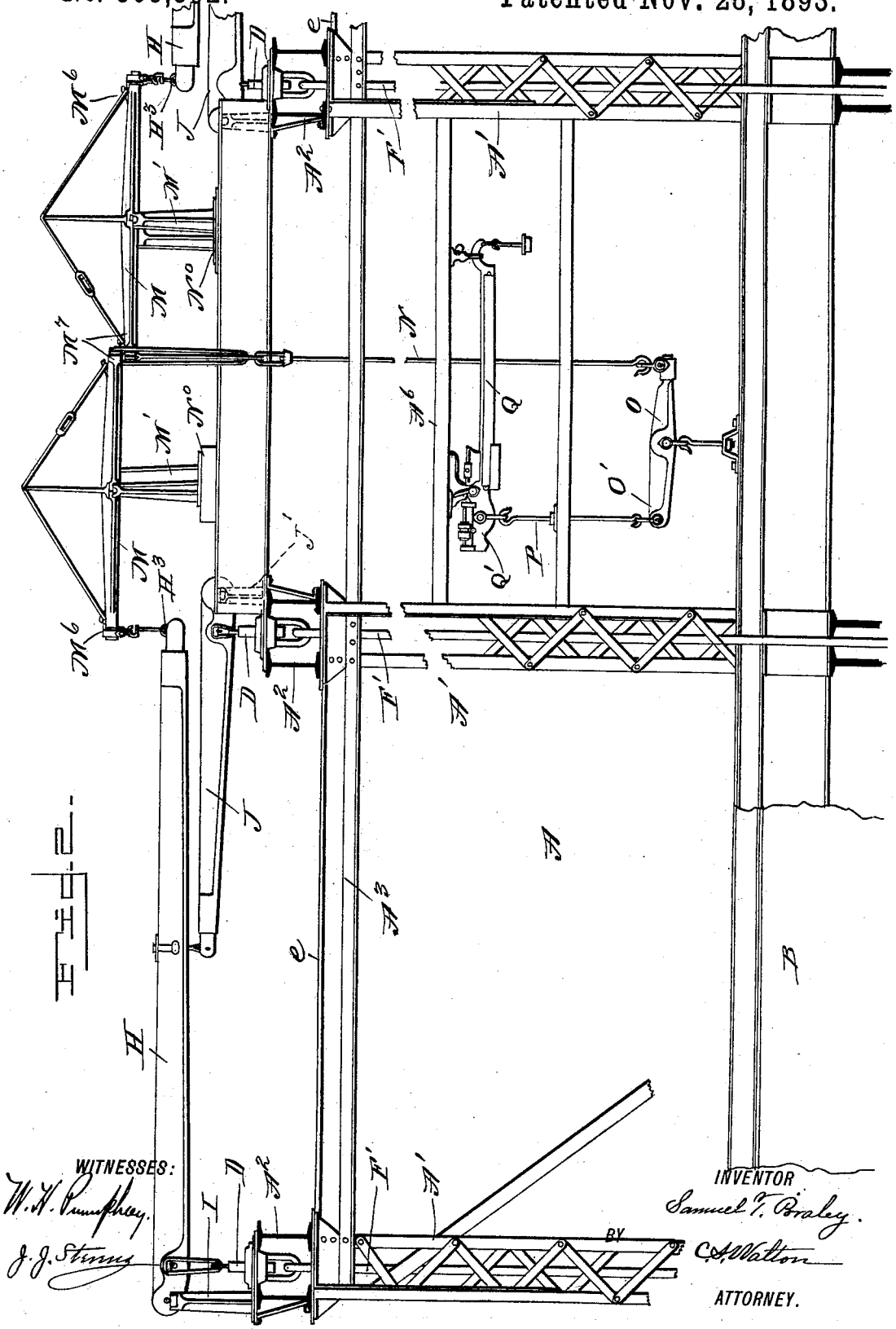
WITNESSES:
INVENTOR
Samuel T. Braley.
BY C.A. Watton
ATTORNEY.

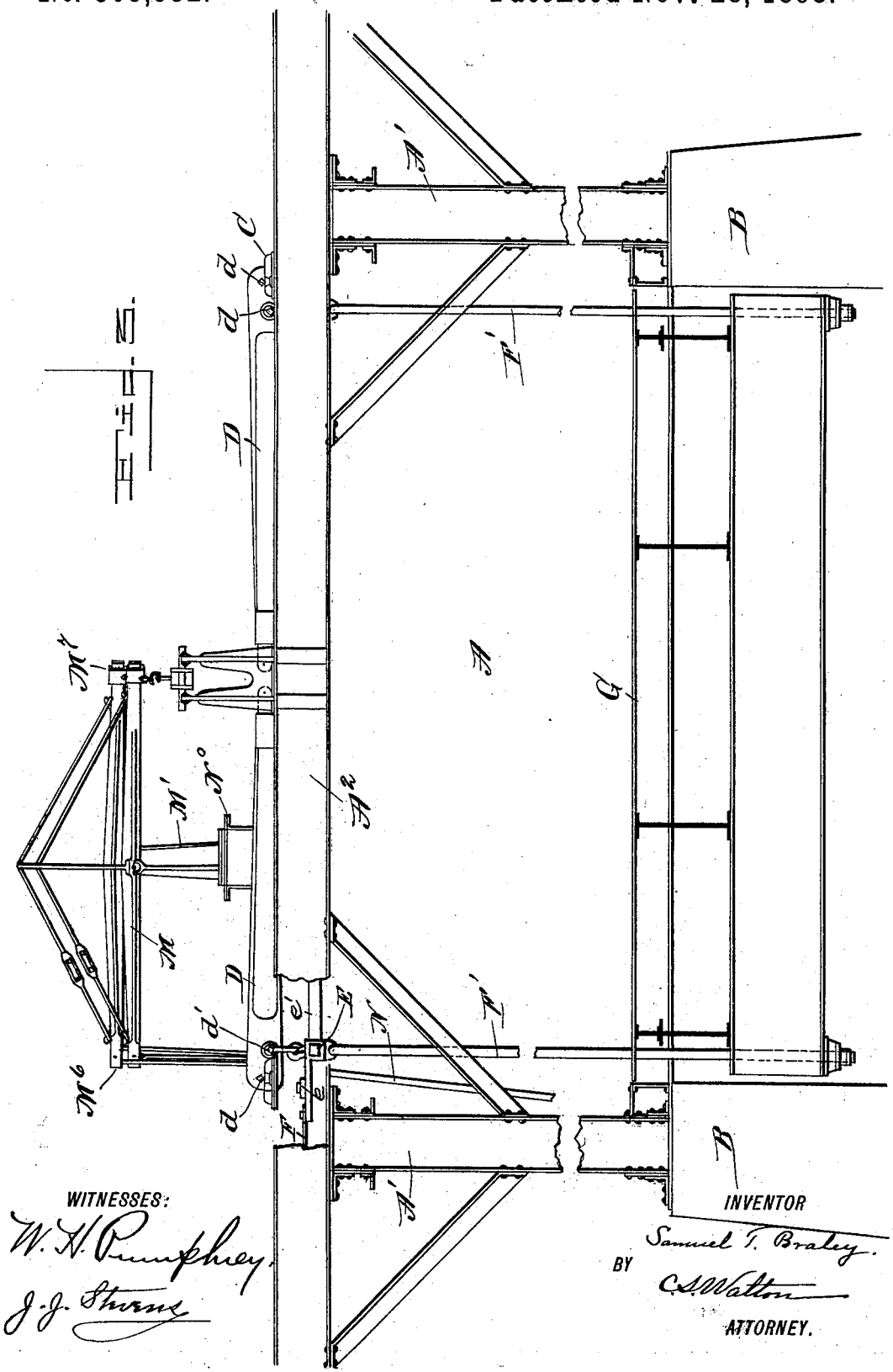

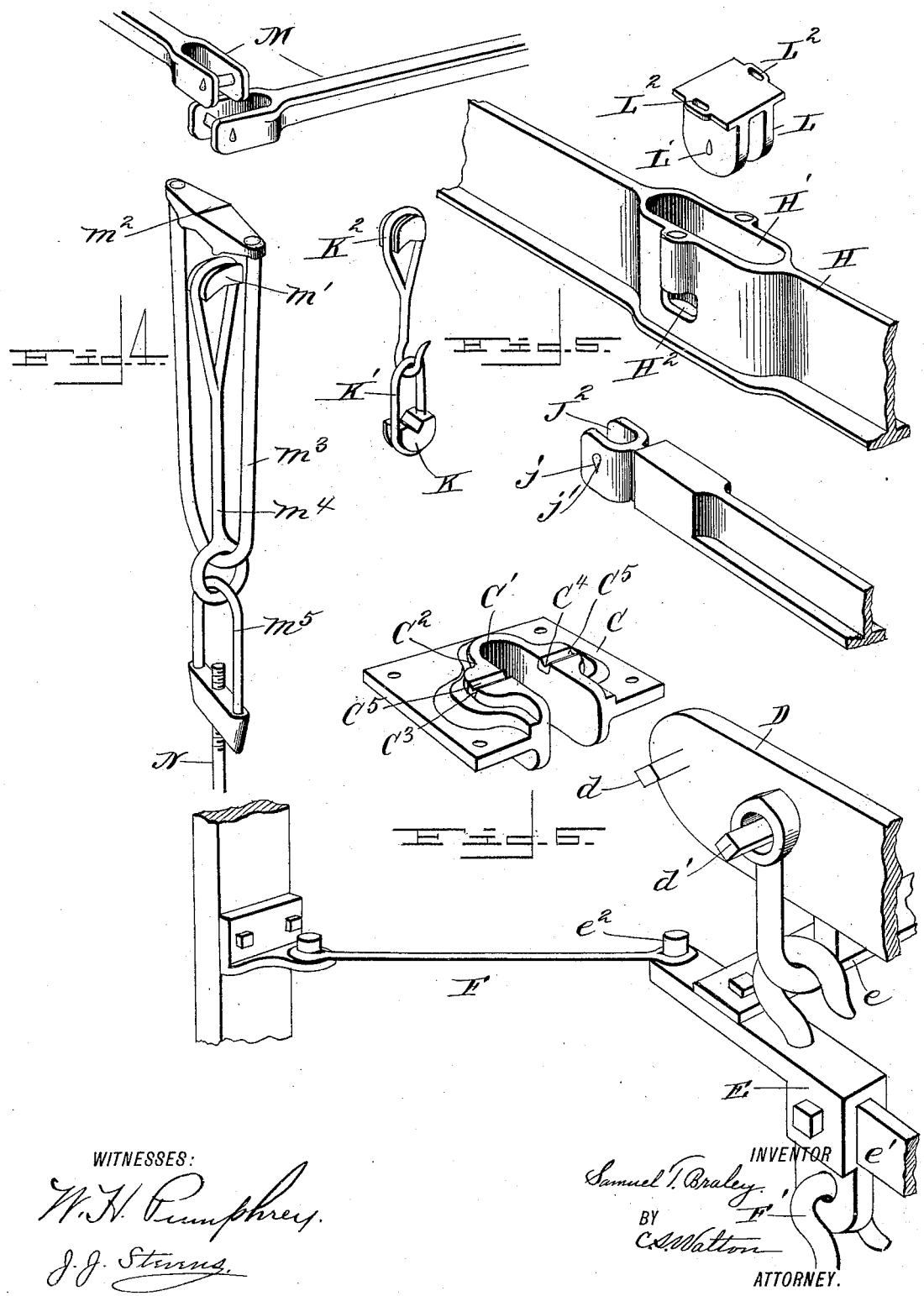

UNITED STATES PATENT OFFICE.

SAMUEL T. BRALEY, OF RUTLAND, VERMONT, ASSIGNOR TO THE HOWE SCALE COMPANY OF 1886, OF SAME PLACE.

PLATFORM-SCALE.

SPECIFICATION forming part of Letters Patent No. 509,592, dated November 28, 1893.

Application filed June 27, 1893. Serial No. 478,945. (No model.)

*To all whom it may concern:*

Be it known that I, SAMUEL T. BRALEY, a citizen of the United States of America, residing at Rutland, in the county of Rutland and State of Vermont, have invented certain new and useful Improvements in Suspended Weighing-Machines, of which the following is a specification.

My invention relates to an improved construction and arrangement of levers and connecting mechanism in a suspended weighing machine, and my invention further consists of certain minor details of construction, arrangement, and combination of various parts of the machine as will hereinafter appear.

The objects of my invention are to provide a weighing machine of simple and durable construction, consisting of one or more independent weighing platforms whereby the machine may be lengthened without requiring a new set of members or levers, in which the strain on the different parts of the machine may be more evenly distributed and regulated than has been the case in machines heretofore constructed.

A further object is to introduce an improved construction between levers overhead and the weight beam below, whereby the power of the mechanism above is transmitted through only one intermediate member or lever directly to the weighing beam, whether one or more independent platforms are used.

A still further object is to provide lower main bearings for the principal levers to reduce the height of the mechanism above its supports and to produce compactness.

For a full and clear understanding of my invention, reference is to be had to the accompanying drawings wherein corresponding letters indicate like parts in the several views.

Figure 1, is a plan view of the machine, one end of which being of similar construction to the other end is broken away for better illustration. Fig. 2, is a side elevation of the machine, one end of which and the foundation wall being partly broken away. Fig. 3, is an end elevation of the machine, showing the platform and foundation walls in cross sections, parts being broken away for better illustration. Fig. 4, is a perspective view showing details of the outer ends and connecting shackles of the divergent levers. Fig. 5, is a perspective view of the second levers, broken away, showing details of connecting shackles and an adjustable slide. Fig. 6, is a perspective view of a main lever showing the bearings and the method of connecting the suspension rods to the main levers and frame.

In the drawings: A represents an upright rectangular frame consisting of three sections erected on a solid foundation B. This frame consists of upright standards A' connected at their upper ends by beams $A^2$, $A^3$, the frame being suitably trussed and braced to combine lightness, compactness, stability, and strength. On the upper surfaces of beams $A^2$, and near their ends, rectangular plates C are secured by bolts or screws. See Figs. 1 and 6. These plates have recesses C' running in the same direction as beams $A^2$ with bearing surfaces or shoulders $C^2$. Midway on the upper surfaces of these shoulders are dove-tailed recesses $C^3$, in which are inserted steel bearing pieces $C^4$ having troughed like bearing surfaces $C^5$ in which rest suitable knife edged bearing pivots $d$ of main levers D. The main levers D are of usual construction, each being about one half the width of frame A and suitably pivoted or connected together in pairs at their inner ends.

E are corner irons suspended from knife edge bearings $d'$ on the main levers near their pivoted bearings by means of hooks and clevises in a well known manner, see Fig. 6.

Corner irons in an end section are connected together by bars $e$ and $e'$, extending crosswise and lengthwise of the machine, which are adjustable in the corner irons by means of slots and set screws, as shown, to permit the connecting rods to be plumbed in case of variations.

Corner irons E have on their upper surfaces projections $e^2$ over which fit eyes on the ends of rods F, the other ends of said rods being suitably fastened to the upper corners of the frame A to prevent undue vibration and oscillation of the clevises on their knife edge bearings.

Weighing platform G is suspended between the foundation walls of the machine by means of rods F' suitably connected to corner irons E by hooks and clevises.

H are second levers of ordinary construction, each being about one quarter the length of and extending lengthwise of frame A, there being one for each end section of the frame. Each second lever H is suitably mounted at its outer end in knife edge bearings in standards I, the latter being secured to the upper surfaces of beams $A^2$ midway of their lengths. See Figs. 1 and 2.

The inner ends of the main levers D, which are mounted on the end beams $A^2$ of the frame, are suspended in a well known manner from knife edge bearings on second levers H near their outer ends, as shown, by hooks and clevises. See Fig. 2. Short second levers J, about one half the length of levers H, are similarly mounted, at their outer ends, on knife edge bearings in standards J' on intermediate cross beams $A^4$ midway of their lengths. Beams $A^4$ rest on the intermediate beams $A^2$ of the frame, as shown. The inner ends of the main levers D which are mounted on the intermediate beams $A^2$ are suspended from knife edge bearings on levers J, near their outer ends, similarly to a manner before described. The inner ends of the short second levers J are provided with recessed heads $J^2$ with apertures $j$, in which are mounted knife edge bearings $j'$ which may be inserted or withdrawn from the apertures through either side of the heads. See Fig. 5. Knife edge bearings $j'$ rest in the bearing blocks K in shackles K'. Shackles K' are suspended from knife edge bearings in sliding blocks L by means of suitable hooks and bearing blocks $K^2$. Lever H about midway of its length has an enlarged part and elongated opening H' therein. Through the sides of the lever and this opening are elongated apertures $H^2$.

The lower part of block L fits into opening H', apertures L' in the lower part of the block being opposite the apertures $H^2$, to permit a knife edge bearing to be inserted in aperture L' or withdrawn without removing the block from opening H'. The upper part of block L is broader, rests upon the sides of opening H', and, by means of elongated slots $L^2$, is suitably secured by set screws to lever H, as shown, the slots admitting of a slight adjustment of the second levers lengthwise of the same.

The inner ends $H^3$ of second levers H are connected to the inner ends $M^6$ of two divergent levers M by means of suitable shackles, hooks, and knife edge bearings.

Levers M are fulcrumed about midway of their lengths in suitable standards M' mounted on movable slides $N^o$ secured in any suitable manner to admit of adjustment on the supporting beams $A^5$, the latter running lengthwise of the frame and resting upon the intermediate beams $A^2$, near one side of the machine.

Levers M are preferably of equal length, each being about the same length as beam H, and they converge, their outer ends $M^7$ falling one under the other at a point midway of the length and at one side of the machine, as shown in Fig. 1. The outer ends $M^7$ of levers M, which are similar to the inner ends of levers J, are connected to a vertical rod N by means of knife edge bearings resting in removable bearing blocks $m'$ $m^2$ in the upper ends of shackles $m^3$ $m^4$ and by means of a turn buckle $m^5$ suitably connected together. See Fig. 4.

Rod N connects levers M to one end of a counter lever O, the latter being fulcrumed to the foundation timbers or beams of the machine by a suitable clevis and hook. The opposite end O' of lever O is connected to the inner end Q' of the weigh beam Q by a rod P.

The weigh beam of any approved construction is suspended from a cross beam $A^6$ of the frame at one side and near the base of the machine, as shown.

From the similar construction of the levers and connecting mechanism at both ends of the machine with rod N, it is evident that the weighing platform could be divided crosswise midway of its length thus forming two distinct scales to operate the same weighing beam, and by placing a similarly constructed weighing machine by the side of this machine, four weighing platforms could, with slight modifications, operate independently and at different times from one weighing beam placed near the center of the four scales.

It will be readily understood from the drawings and description that the mechanism at one end of the machines may be disconnected without interfering with the other end.

The middle section of the machine may be lengthened by changing the angle of the divergent levers M or by substituting longer levers for levers M, and a scale of four main levers D can be made with the weigh beam at the center line crosswise by using two short levers J for levers H and J, and one lever M.

The machine being properly adjusted, the weight of a load on the platform is transmitted through rods F', levers D, H, and J, to lever or levers M, and thence through rod N, counter lever O, and rod P to the weighing beam, from which it will be seen that the upward strain is resisted at the fulcrum of the counter lever which is fastened to the foundation of the frame.

Having thus described my invention, what I claim as new, and desire to secure by Letters Patent, is—

1. In a suspended weighing machine, the combination of a frame consisting of three sections, a set of four main levers in each end section running transversely of the machine, each main lever being pivoted at its outer end in plates on the frame near the upper corners of the end sections, two long second levers pivoted at their outer ends in standards on the upper end beams midway of their length and lying lengthwise of the machine, the inner ends of the main levers being suspended from the long second levers from points near the outer ends of the latter, two short second levers pivoted at their outer ends, in standards on intermediate cross beams near the center thereof, and having their inner ends adjustably suspended from the main levers, converging levers fulcrumed on standards on the middle section, near the side of the frame, having their inner ends connected with the inner ends of the long second levers, a vertical rod connected at its upper end to the outer ends of the converging levers, a counter lever fulcrumed to the side foundation of the machine toward which the levers converge, and connected at one end to the lower end of the vertical rod, a vertical rod connecting the opposite end of the counter lever with the inner end of a weighing beam mounted at one side of the frame near the base of the machine, a weighing platform, and corner irons and rods suspending the platform between the foundation walls of the machine from points on the main levers near their pivotal bearings, substantially as described and set forth.

2. A suspended weighing machine comprising a rectangular sectional frame, main levers transversely mounted on knife edge pivotal bearings near their outer ends, removable steel bearing pieces in plates near the upper corners of the end sections of the frame in which the knife edge bearings of the main levers rest, longitudinal long second levers pivotally mounted at their outer ends in knife edge bearings on the upper end beams of the frame and connected near their outer ends to the inner end of the main levers, short second levers pivotally mounted at their outer ends in standards on intermediate cross beams and adjustably suspended at their inner ends in removable knife edge bearings from the long second levers, converging levers adjustably mounted on intermediate cross beams having their inner ends connected to the inner ends of the long second levers, a vertical rod connected to the outer ends of the converging levers, a counter lever fulcrumed to the foundation of the frame and attached at one end to the vertical rod, a second vertical rod connecting the opposite end of the counter lever and the inner end of a weigh beam mounted in the frame over the counter lever, a weighing platform between the foundation walls of the machine, suspended by rods and corner irons from the main levers, as and for the purposes set forth.

3. A suspended weighing machine comprising a rectangular frame, main levers, long and short second levers, converging levers adjustably mounted on intermediate crossbeams, connecting mechanism between the levers, a vertical rod connected at its upper end to the outer ends of the converging levers, a counter lever fulcrumed to the foundation of the machine at the side toward which the levers converge and having one of its ends connected with said vertical rod, a second vertical rod connecting the opposite end of the counter lever and the inner end of a weigh beam, said beam being mounted in the frame over the counter lever, a weighing platform, between the foundation walls, suspended by corner irons and vertical rods attached thereto and to the corners of the platform, adjustable bars connecting the corner irons with the upper corners of the frame, substantially as described and set forth.

In testimony whereof I affix my signature in presence of two witnesses.

SAMUEL T. BRALEY.

Witnesses:
CARL B. HINSMAN,
EDWARD V. ROSS.